Dec. 23, 1969  J. A. MARSH  3,485,698
CONSTRUCTION OF SEATS
Filed June 21, 1967  2 Sheets-Sheet 1

INVENTOR
JOHN ALFRED MARSH
BY
ATTORNEY

Dec. 23, 1969   J. A. MARSH   3,485,698
CONSTRUCTION OF SEATS
Filed June 21, 1967   2 Sheets-Sheet 2

INVENTOR
JOHN ALFRED MARSH
BY
ATTORNEY

United States Patent Office 3,485,698
Patented Dec. 23, 1969

3,485,698
CONSTRUCTION OF SEATS
John A. Marsh, St. Austell, Cornwall, England, assignor to Bostrom Manufacturing Company Limited, Northampton, England, a British company
Filed June 21, 1967, Ser. No. 647,832
Claims priority, application Great Britain, June 21, 1966, 27,659/66
Int. Cl. B60n 1/00
U.S. Cl. 156—267                                                  1 Claim

ABSTRACT OF THE DISCLOSURE

A seat, in particular for a vehicle, comprises a seat pan having superimposed thereon a cushion and a covering skin, and a hole extends through the seat for drainage of rainwater. To render the seat watertight, the drainage hole is lined with a drainage tube formed in one piece with the skin, and the periphery of the skin is secured and sealed within a C-section rim of the seat pan.

---

This invention relates to seats, in particular for use on tractors and other vehicles, and more particularly to a method of attaching the covering skin of an upholstered seat.

According to the invention there is provided a seat comprising a seat pan having, on its upper face, a cushion over which extends a covering skin whose edge is secured to the seat pan, the seat having a drainage hole extending therethrough and a drainage tube lining the hole through the cushion and seat pan for preventing ingress of water into the cushion, and wherein the drainage tube is integral with the skin and the portion of the drainage tube extending through the hole in the seat pan is tightly engaged with the seat pan.

The present invention also provides a seat comprising a sheet metal seat pan, a cushion thereon and a covering skin which overlies the cushion, the skin being formed in one piece with a drainage tube which extends through a hole in the cushion and through a corresponding hole in the seat pan and opens on the underside of the seat for draining away rainwater falling on the seat.

According to another aspect, the present invention provides the method of manufacturing a seat which comprises the steps of locating a cushion on a seat pan, forming a covering skin and a drainage tube in one piece, passing the drainage tube through the cushion and the seat pan, fitting a resilient annular grommet under compression into the tube until it is located within the hole through the seat pan and presses the drainage tube on to the rim of the hole in the seat pan.

One form of seat in accordance with the invention, and its method of manufacture, will now be described with reference to the accompanying drawings in which.

Figure 1:
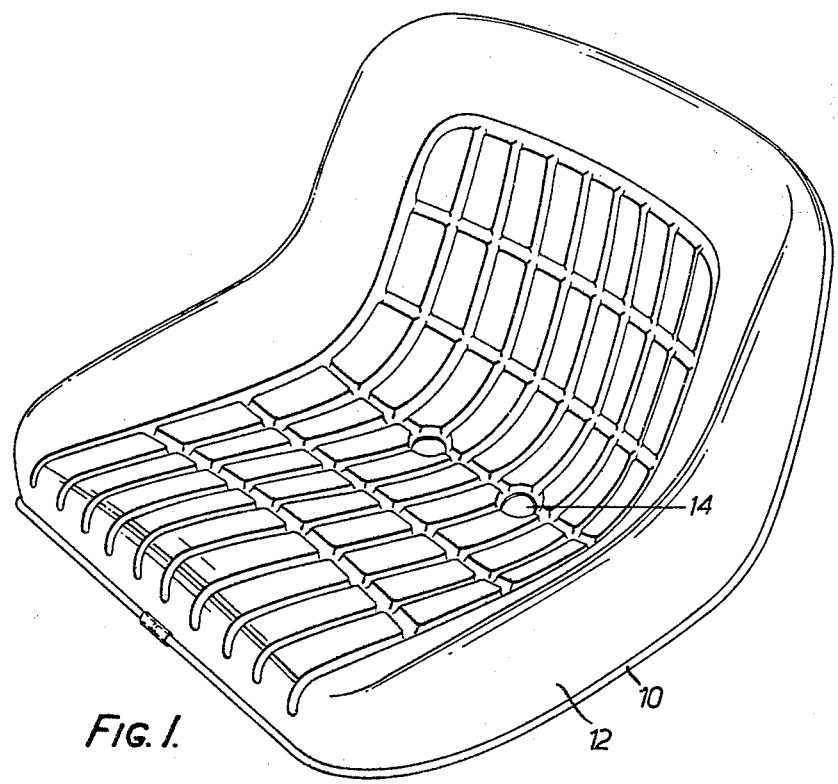
FIG. 1 is a perspective view of a "bucket" type seat for a tractor, having two drain holes.

As shown in the drawings, the seat comprises a "bucket" type seat pan 10 of sheet metal, a layer 11 of foam plastic or rubber extending over the front surface of the seat pan and forming a cushion, and a skin 12 secured at its periphery 12a to the edge portion 13 of the seat pan.

Figures 2, 3:
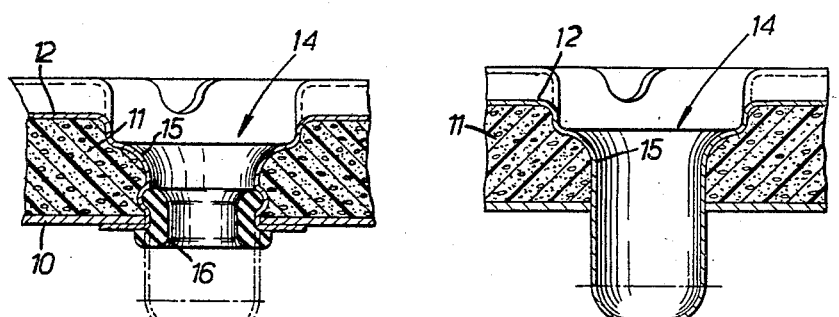
FIG. 2 is a section taken through part of the seat during one phase of its construction.
FIG. 3 is a section corresponding to that of FIG. 2 upon completion of the construction.

In any position in which a drain hole 14 is required, superimposed openings are formed in the seat pan and cushion. Moreover the skin is formed integrally with a drainage tube 15 for each drainage hole, the tube being shaped to fit into a corresponding drain opening in the seat pan and cushion, and initially being closed at its lower end (see FIG. 2). The skin can conveniently be made of the material known as "Hypalon," or a polyvinyl chloride compound.

In the construction of the seat, the skin and cushion are placed in position on the seat pan, the edge portion of the skin is secured to the edge portion of the seat pan, and suction is applied to the underside of the seat pan to evacuate air from between the skin, cushion and seat pan, via the drain holes, thus drawing the skin asd cushion down tightly against the seat pan and causing the bottom of each drainage tube to project through the corresponding drainage hole in the pan.

A retainer in the form of a resilient annular grommet 16 having an outer peripheral groove, is then fitted under compression into each drainage tube and released to spring outwardly and press the material forming the drainage tuge tightly against the rim of the drainage hole of the pan. In this way, the portion of the drainage tube below the drainage hole is flared outwardly against the underside of the seat pan. Finally, the portion of the drainage tube below the retainer is cut away to leave the drainage hole open (see FIG. 3).

In this way, the difficulty is overcome of avoiding water leakage into the cushion between the cover and a grommet forming a liner to the drain hole. With most of the materials suitable for the manufacture of seat covers and grommets, this leakage is difficult to eliminate even by the application of synthetic resin adhesive between the parts.

Figure 4:
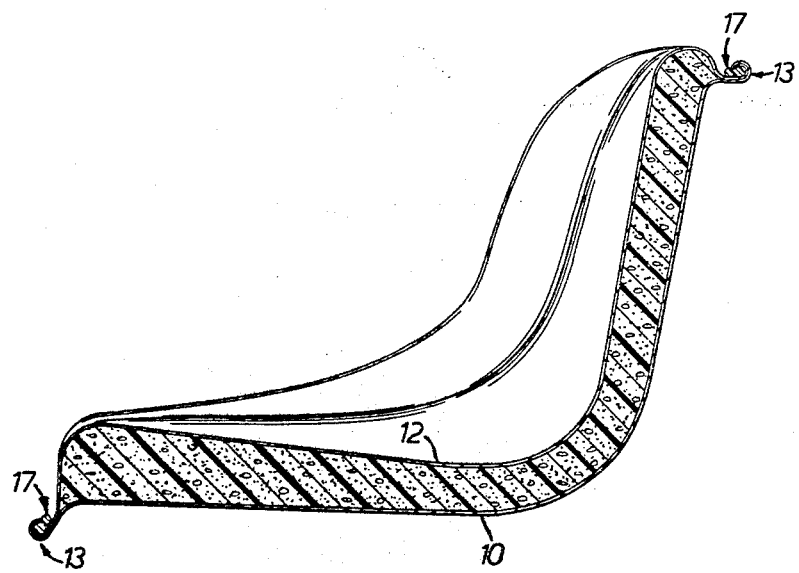
FIG. 4 is a section through the seat, in particular showing the way in which the edge of the seat cover is fitted to the edge of the seat pan.
Figure 5:
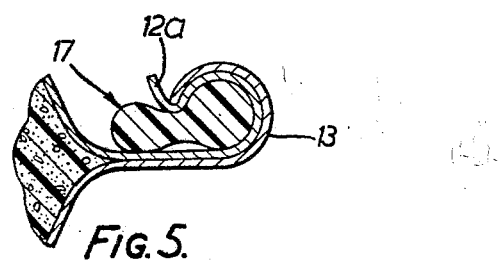
FIG. 5 is an enlarged sectional view showing the edge construction of FIG. 4.

The seat pan is formed with a rolled edge 13 directed toward the front face of the seat, the rolled edge portion being of C section. The edge portion of the cover is secured in this C section by means of a plastic beading or trim 17 of approximately "figure of eight" section (see FIGS. 4 and 5).

In carrying out the fixing of the cover, the edge portion 12a of the cover is fitted into the C section, with the outer part of the edge portion projecting beyond the final edge of the C section. Preferably the edge portion of the cover or the inner face of the C section, or both, are coated with epoxy resin or like adhesive before the two are brought together, to assist in preventing the cover from pulling away and in preventing the ingress of water. The trim which has preferably been preformed to the periphery to the pan, is then forced into the C section, and the C section is slightly closed up by the application of pressure, e.g. by hammering or rolling. The surplus portion of cover can then be trimmed away.

I claim:
1. The method of manufacturing a seat of the type having a rigid seat pan, a cushion and a flexible covering skin secured to the seat pan, and having one or more drainage holes projecting through the seat, the method comprising the steps of:
   providing a seat pan with an aperture at the location of the desired drainage hole;
   positioning a cushion on top of said seat pan, with said cushion being of a size which conforms to said seat pan and said cushion having an aperture which is in alignment with said seat pan aperture;
   positioning a covering skin on top of said cushion, with said covering skin having a closed-end drainage tube located to project into said aligned apertures of said cushion and seat pan;
   providing vacuum on the pan side of the afore- described pan-cushion-skin assembly to thereby evacuate air between the skin, cushion and seat pan to draw the skin and cushion tightly against said seat pan and to cause the bottom of said drainage tube to project through said apertures of said cushion and seat pan;

fitting a resilient annular grommet under compression into said tube until it is located within the aperture of said seat pan and engaging said grommet within said aperture to permanently secure the skin at said tube with said seat pan;

cutting the closed end of said tube to thereby provide a drainage hole for the seat; and adhesively attaching the edges of said skin to the rim of said seat pan.

References Cited

UNITED STATES PATENTS

| | | | |
|---|---|---|---|
| 3,273,178 | 9/1966 | Baruth et al. | 5—353.2 |
| 3,341,251 | 9/1967 | Costin | 297—452 |

HAROLD ANSHER, Primary Examiner

J. C. GIL, Assistant Examiner

U.S. Cl. X.R.

156—286, 293; 264—101; 297—452